United States Patent [19]

Leitermann et al.

[11] 4,441,259
[45] Apr. 10, 1984

[54] METHOD, AND MEANS, FOR IN SITU DETERMINATION OF ALIGNMENT OF A VEHICLE FRAME

[76] Inventors: Alfred Leitermann, 4 Lakewood Pl., Port Monmouth, N.J. 07758; Gary B. Mason, 2164 Holly Hill Rd., Lakehurst, N.J. 08733

[21] Appl. No.: 342,825

[22] Filed: Jan. 26, 1982

[51] Int. Cl.³ .............................................. G01B 5/25
[52] U.S. Cl. ................................. 33/288; 33/180 AT
[58] Field of Search ........... 33/288, 180 AT, 181 AT, 33/336, 412

[56] References Cited

U.S. PATENT DOCUMENTS

| | | | |
|---|---|---|---|
| 2,401,980 | 6/1946 | Smith | 33/288 |
| 3,786,572 | 1/1974 | Larson | 33/288 |
| 3,983,635 | 10/1976 | Jarman | 33/288 |
| 4,319,402 | 3/1982 | Martin | 33/181 AT |

FOREIGN PATENT DOCUMENTS

| | | | |
|---|---|---|---|
| 121981 | 5/1971 | Norway | 33/288 |
| 496541 | 12/1938 | United Kingdom | 33/412 |

*Primary Examiner*—Willis Little
*Attorney, Agent, or Firm*—Stanley W. Sokolowski

[57] ABSTRACT

In a disclosed practice, the method comprises pendently attaching translucent sighting targets to a plurality of at least three vehicle frame datum points, at distances, standardly-prescribed for the particular vehicle, from the latter's reference line (or one of such reference lines), and taking a linear sighting, with a coherent light beam, through the targets to ascertain alignment and misalignment, if any of the latter, of any one of the targets relative to at least two others thereof. The novel means, in a disclosed embodiment thereof, comprises a plurality of sighting targets and hangers for pendently attaching the targets to vehicle frame datum points, and a laser gun for directing a laser beam along the targets to determine alignment and misalignment of any one of the targets relative to to two others thereof.

10 Claims, 10 Drawing Figures

U.S. Patent      Apr. 10, 1984      4,441,259
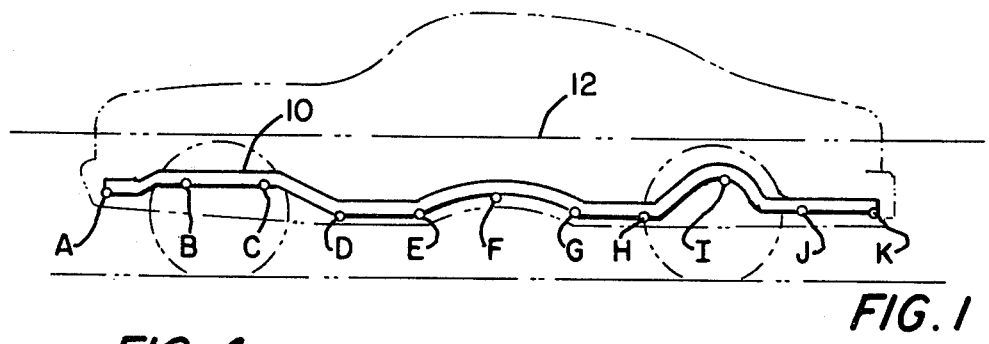
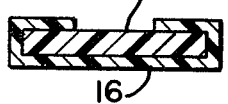
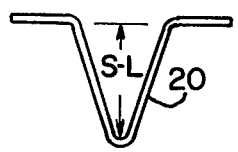
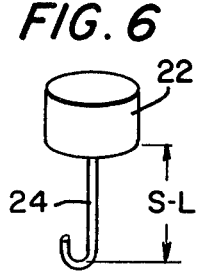
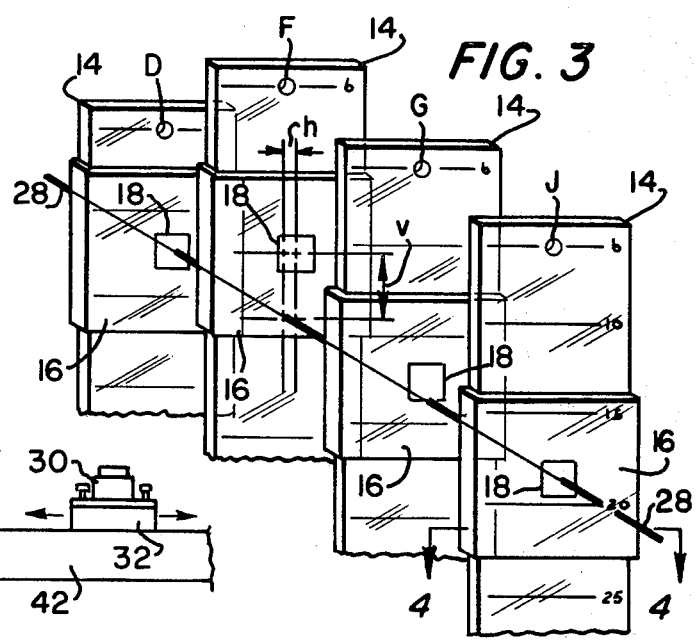
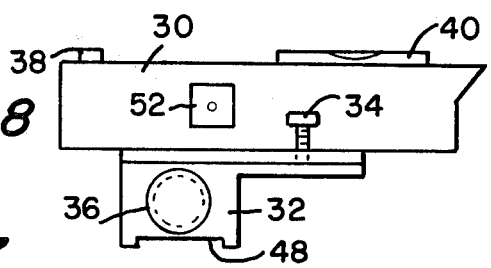
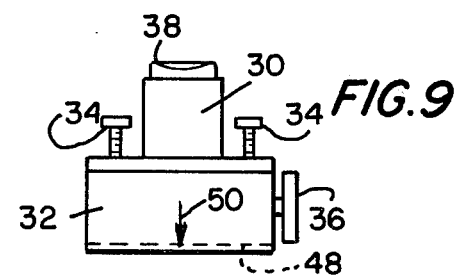
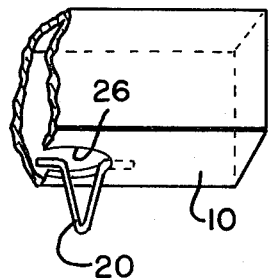
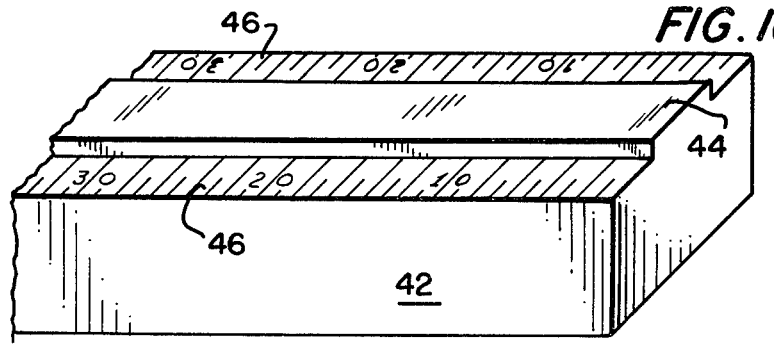

METHOD, AND MEANS, FOR IN SITU DETERMINATION OF ALIGNMENT OF A VEHICLE FRAME

This invention pertains to vehicle frame alignmemt-determining methods and apparatus, and in particular to such methods and apparatus which accommodate the practice and use thereof in situ, i.e., whereat the vehicle subject to examination happens to be located, and in any given environment.

Methods and apparatus of the type to which this invention pertains are well known in the prior art. However, typically they require that the vehicle and frame be supported on a platform, with the vehicle frame securely fastened thereto, and the vehicle frame leveled and in elevation. Thus, these prior art practices and devices require that the vehicle be transported to an installation where such alignment-determining apparatus is in place. Such prior practices and devices are unable to ascertain the alignment of a vehicle frame in situ, i.e., in a parking lot, in a driveway, etc. Yet, there is a need for a method and means for such in situ determination of vehicle frame alignment; particularly such would be useful for on-side verification of collision damage. Additionally, there is a need for such on-site frame alignment examinations where the environment is otherwise not conducive to such. This is where the parking lot, driveway, and the like is sloping, or rubbled, or similarly characterized as to afford no true horizontal attitude of the vehicle frame. Further, in this respect, is the situation in which the vehicle in question has rear-end risers which elevate the rear of the frame.

It is an object of this invention to set forth a method and means for in situ determination of alignment of a vehicle frame, regardless of the environment or the attitude of the vehicle.

Particularly it is an object of this invention to disclose a method for in situ determination of alignment of a vehicle frame, which frame has a reference line and datum points, comprising the steps of attaching sighting targets to a plurality of at least three of the vehicle frame datum points at standardly-prescribed distances, for each of the sighting targets, from the vehicle frame reference line; and taking a linear sighting, with sighting means which is (a) wholly independent of, (b) universally-movable in isolation from, and (c) freely emplaceable in a selected adjacency to said vehicle frame, along said targets to ascertain alignment and misalignment of any one of said targets relative to at least two others thereof.

It is further an object of this invention to set forth means for in situ determination of alignment of a vehicle frame, which frame has a reference line and datum points, comprising a plurality of sighting targets; and means for attaching said sighting targets of said plurality thereof, separately, to selected ones of said vehicle frame datum points; wherein said attaching means comprises means for attaching said sighting targets, selectively, at standardly-prescribed distances, for each of said targets, from the vehicle reference line; and sighting means, which is (a) wholly independent of, (b) universally-movable in isolation from, and (c) freely emplaceable in a selected adjacency to said vehicle frame, for taking a linear sighting along said targets to ascertain alignment and misalignment of any one of said targets relative to at least two others thereof.

Further objects of this invention, as well as the novel features thereof, will become more apparent by reference to the following description, taken in conjunction with the accompanying figures, in which:

FIG. 1 is a side elevational view of a vehicle frame, the vehicle being shown in phantom outline, showing typical datum points and a given reference line therefor;

FIG. 2 is a rear elevational view of a fragment of a vehicle frame, and a pendent scale and target with a laser gun and trackway therefor;

FIG. 3 is a perspective view of a plurality of pendent scales and targets, as they would depend from selected vehicle frame datum points, and a penetrating coherent light beam;

FIG. 4 is a cross-sectional view, of one of the scales and targets, taken along section 4—4 of FIG. 3;

FIGS. 5 and 6 are vertical elevational and perspective views, respectively, of scale hangers;

FIG. 7 is a fragmentary view of a portion of a vehicle frame, showing a datum point aperture therein and a scale hanger, according to the invention, resiliently fixed in the aperture;

FIGS. 8 and 9 are side elevation and rear end views of the laser gun; and

FIG. 10 is a perspective view of only one end portion of the laser gun slide-track.

As shown in the figures, a given vehicle frame 10 has a plurality of datum points "A" through "K" along a side thereof, and a relevant reference line 12. Now, in accordance with standard specifications for the vehicle concerned, each of the datum points must obtain prescribed distances from the reference line 12—if the frame 10 will be in true alignment. To ascertain whether or not such true alignment obtains, it is an already known practice to attach pendent scales to given ones of the datum points "A" through "K," and take a linear sighting therealong. The linear sighting should traverse each of the pendent scales at distances from the reference line 12 which are set out in published standards. Where one or more of the scales are traversed by the linear sighting at off-standard distances, it is then readily apparent that the frame portions from which such scales depend are in misalignment and require reforming.

Prior art apparatus and devices require that the vehicle be mounted on a platform, elevated, and frame be leveled and clamped to the platform. Then the scales are attached to datum points and the linear sighting is taken.

According to our invention, such mounting, elevation, leveling and clamping is not necessary; a vehicle frame can be checked for its alignment with the vehicle pitched on an incline, and tilted laterally.

With reference to FIG. 1, it will be recognized that the vehicle frame 10 has suffered damage, intermediate the length thereof, in the area of datum points "F" and "G." To practice our in situ method of determining the mislignment degree of the frame 10, with the apparatus herein described, one proceeds as follows. Dimensionally-graduated scales 14, having slidably-engaged target sleeves 16 are pendently attached to two (or more) relatively remote, non-displaced datum points. For the purposes of illustration, the latter are datum points "D" and "J." Additionally, then, scales 14 (with sleeves 16) are further pendently attached to datum points "F" and "G"—whereat the frame is damaged and distorted.

The scales 14 are formed of translucent plastic, as are the slidably-engaged target sleeves 16. Centrally of the sleeves 16 are formed alignment-tolerance frames 18. Now, patently, whatever the attitude of the vehicle frame 10, if a linear sighting is taken through the frames 18 of sleeves 16 of the scales 14 which depend from datum points "D" and "K," such sighting will be in true parallelism with the reference line 12. To take such a sighting, the scales 14 are suspended from the cited datum points in a free-swinging disposition. The uppermost end of each scale 14 has a suspension hole formed therein to receive a hanger. FIG. 5 illustrates a simple spring-wire hanger 20 which may be used, and FIG. 6 illustrates an alternate embodiment comprising a magnet 22 with an extending hook 24. Hanger 20, as shown in FIG. 7, is compressed to accommodate its insertion into a datum point aperture 26 formed in the frame 10. If one wishes, the alternative embodiment, with the magnet 22 can be set against the frame 10 in immediate adjacency to the aperture 26, or used with frames which have no such apertures.

Each of the hangers have a prescribed suspension length "S-L" which comprises, for example, six increments of graduations as are set out on the scales. Thus, the scales 14 have graduation increments which commence, at the suspension holes therein, with the sixth graduation.

With reference to published specifications for the vehicle concerned, the target sleeves 16 on the scales 14 pendent from datum points "D" and "J" are slid along the scales until they fix the alignment-tolerance frames centrally upon the dimension, from the reference line 12, which is indicated as the alignment standard. Next, the same operation is carried out for the sleeves 16 of the scales 14 which depend from the frame-distorted portion whereat the datum points "F" and "G" are located. This is illustrated in FIG. 3.

FIG. 3 shows the scales 14 in substantially uniformly spaced apart disposition. This is done only for space-saving purposes in the drawing. Actually, as will be evident for FIG. 1, the scale 14 dependent from datum point "D" would be further removed from the scale most adjacent thereto, and scale 14 dependent from datum point "J" would be quite remote from the scale most adjacent thereto. For the explanatory purposes herein, use of non-distorted or non-damaged datum points "D" and "J" are likely to be sufficient to establish the degree of mis-alignment of datum points "F" and "G." Ideally, perhaps, datum points "A" and "K" might have been used, in lieu of points "D" and "J," or in addition to the latter. In FIG. 3 there is also shown a linear sighting beam 28; it perfectly penetrates the dead-center of the frames 18 in the sleeves 16 which hang below the datum points "D" and "J." The beam 28, however, passes below the frame 18 of the sleeve 16 in suspension under datum point "G," and below and off to one side of the frame 18 in suspension below datum point "F." With reference to the latter, it can be seen that datum point "F" is a "v" distance out of vertical alignment, and an "h" distance out of horizontal alignment.

The linear sighting, it will be appreciated, can be done with the naked eye, if desired and, for the purpose, the frames 18 can be imprinted in red or heavy black, or such distinguishing colors. One would so position himself as to sight along the scales 14 and frames 16 until the frames dependent from datum points "D" and "J" are observed to be in superimposed alignment. Then, the relative displacement of the distinguishingly-colored other frames would be observable.

Optionally, the frames 16 can be rendered in luminescent substances, so that by simply directing the beam of a flashlight, or the like, the superimposition or misalignment thereof will be evident. Our invention, however, comprehends the use of a laser gun.

The laser gun 30 shown in FIGS. 2, 8 and 9 is supported on a carriage 32. Leveling screws 34 are provided, at each side of the gun, to adjust the lateral disposition of the gun, and a handwheel 36 at the one side of the carriage 32 is used to adjust the longitudinal disposition of the gun 30. Hence, the gun 30 is gimballed in the carriage 32, so that the screws 34 and handwheel 36 may be manipulated to set leveling as warranted by the bubble-levels 38 and 40 which are carried on the top of the gun 30. Of course, the handwheel 36 is also used to raise the gun 30, as to check alignment of a roof line of a vehicle, or a door frame, etc. The gimballing structure is not shown herein, but such arrangements are well within the ken of those skilled in the technology to which the invention pertains.

As frame alignment checking may be undertaken in an environment in which the ground surface is rubbled or otherwise uneven, our invention includes the use of a slide-track 42. Track 42 has a raised land 44 with graduation-marked shoulders 46 to each side thereof. The land 44 is received in a recess 48 formed in the base of the carriage 32; thus, the gun 30 and carriage 32 can be slidably positioned lengthwise of the slide-track 42. On the rear face of the carriage 32, and in line with the coherent beam—such as beam 28—is an indicator arrow 50. The latter is used to take distance measurements on the shoulders 46, for instance, to check corresponding datum points, on opposite sides of a frame, for same distances from adjacent datum points.

If necessary, the slide-track may be raised by jacks to bring the coherent beam 28 to an elevation in which it can penetrate the frames 18 which depend from datum points "D" and "J," and the jacks and screws 34 and handwheel 36 adjusted to define a true, dead-center penetration. It is to be noted, however, that this may be done even if the frame is leaning somewhat to one side. The scales 14, for being in free-swinging suspension, will assume a vertical disposition, with those depending from non-damaged portions of the frame in true alignment.

If the frame 10 is pitched downwardly, due to the aforementioned "risers," or because of a pitched-surface driveway or parking lot, it will be of no consequence. Again, it is necessary only to adjust the jacks and/or the screws 34 and handwheel 36 to cause the beam 28 to pass dead-center through the frames 18 which depend from datum points "D" and "J."

When two separate tracks and laser guns are used for longitudinal and transverse measurements, the process is faster since the laser beam of one leveled gun and track is used to assure that the other gun and track are leveled in the same plane by directing the beam at a target on the side of the other gun 52.

What makes this invention particularly unique is the fact that it enables the checking of the alignment of a vehicle frame 10 wherever it happens to be situated. The laser gun 30 and slide-track is wholly independent of, universally-movable in isolation from, and freely emplaceable in a selected adjacency to the vehicle frame. One need only transport the gun 30 and carriage 32, slide-track 42, jacks (if necessary), and scales 14 (with sleeves 16) and hangers to where the vehicle is located. Now, patently, the same use of the invention will obtain in a garage or repair shop. Yet, the vehicle and frame 10 need never be moved, leveled, clamped or elevated. The gun 30 and carriage 32, and slide-track 42 are wholly free of the frame 10, and are simply emplaced in adjacency thereto. Vis-a-vis prior art methods and apparatus, this invention offers a simplicity and economy which are most significant, particularly because this method and means can be used with any straightening apparatus, and does not intrude into the operational areas of the latter apparatus.

While we have described our invention in connection with specific methods of practice, and specific embodiments of structure, it is to be clearly understood that this is done only by way of example and not as a limitation to the scope of the invention as set forth in the objects thereof and as defined in the following claims. As noted, the frames 18 may be made limunescent to enable the use of a simple flashlight beam, or in distinguishing color to enable a naked-eye observation of alignment. The gun carriage 32 could be gear-engaged with the slide-track, to facilitate the movement of the former along the latter. Too, the sleeves 16, frictionally-engaged with the scales 14, could be otherwise movable along the scales, and hangers other than those illustrated in FIGS. 5 and 6 may be employed. All alternative embodiments are deemed to be within the ambit of our invention and comprised by the claims drawn thereon.

We claim:

1. A method for in situ determination of alignment of a vehicle frame, which frame has a reference line and datum points, comprising the steps of:
    attaching sighting targets to a plurality of at least three of the vehicle frame datum points at standardly-prescribed distances, for each of the sighting targets, from the vehicle frame reference line; and
    taking a linear sighting, with sighting means which is (a) wholly independent of, (b) universally-movable in isolation from, and (c) freely emplaceable in a selected adjacency to said vehicle frame, along said targets to ascertain alignment and misalignment of any one of said targets relative to at least two others thereof; wherein
    said attaching step comprises attaching sighting targets which are, at least in part, substantially planar;
    said linear sighting step comprises taking a linear sighting along said targets, as aforesaid, which is perpendicular to said targets;
    said attaching step further comprises attaching sighting targets which have alignment-tolerance frames visible thereon;
    said linear sighting step further comprises moving said sighting means until linear sighting thereby establishes linear alignment of said frames of said two other targets; and
    said attaching step further comprises attaching to said datum points translucent, dimensionally-graduated scales which have the aforesaid alignment-tolerance frames movable thereon.

2. A method for in situ determination of alignment of a vehicle frame, according to claim 1, wherein:
    said linear sighting step comprises taking a linear sighting along said targets, as aforesaid, which is parallel with said vehicle frame reference line.

3. A method for in situ determination of alignment of a vehicle frame, according to claim 1, wherein:
    said linear sighting step further comprises sighting along said targets with a light beam.

4. A method for in situ determination of alignment of a vehicle frame, according to claim 1, wherein:
    said attaching step comprises attaching said targets to said datum points in free-swinging pendency.

5. Means for in situ determination of alignment of a vehicle frame, which frame has a reference line and datum points, comprising:
    a plurality of sighting targets; and
    means for attaching said sighting targets of said plurality thereof, separately, to selected ones of said vehicle frame datum points; wherein
    said attaching means comprises means for attaching said sighting targets, selectively, at standardly-prescribed distances, for each of said targets, from the vehicle frame reference line; and
    sighting means, which is (a) wholly independent of, (b) universally-movable in isolation from, and (c) freely emplaceable in a selected adjacency to said vehicle frame, for taking a linear sighting along said targets to ascertain alignment and misalignment of any one of said targets relative to at least two others thereof; and wherein
    said sighting targets comprise translucent, dimensionally-graduated scales which have alignment-tolerance frames visible thereon.

6. Means for in situ determination of alignment of a vehicle frame, according to claim 5, wherein:
    said sighting targets are, at least in part, substantially planar; and
    said sighting means comprises means for taking a linear sighting perpendicular to said targets.

7. Means for in situ determination of alignment of a vehicle frame, according to claim 5, wherein:
    said scales include translucent sleeves movably engaged therewith; and
    said alignment-tolerance frames are formed on said sleeves.

8. Means for in situ determination of alignment of a vehicle frame, according to claim 5, wherein:
    said sighting means comprises means for sighting through said scales with a light beam.

9. Means for in situ determination of alignment of a vehicle frame, according to claim 8, wherein:
    said sighting means comprises means for sighting with a coherent light beam.

10. Means for in situ determination of alignment of a vehicle frame, according to claim 5, wherein:
    said attaching means further comprises means for attaching said targets to said datum points in a free-swinging pendency.

* * * * *